United States Patent

[11] 3,603,017

[72] Inventor Karl G. T. Happe
 38 Tara Avenue, Scarborough, Ontario, Canada
[21] Appl. No. 865,663
[22] Filed Oct. 13, 1969
[45] Patented Sept. 7, 1971

[54] ICE FISHING APPARATUS
 11 Claims, 6 Drawing Figs.
[52] U.S. Cl. .................................................... 43/17, 43/21.2, 211/1.3
[51] Int. Cl. ................................................... A01k 97/12
[50] Field of Search ............................................. 43/17, 21.2, 26; 211/1.3

[56] References Cited
UNITED STATES PATENTS
2,732,649 1/1956 Tuttle ........................... 43/17
2,438,388 3/1948 Dolk ............................ 43/21.2 UX
2,473,047 6/1949 Bershad ....................... 211/1.3

FOREIGN PATENTS
727,359 2/1966 Canada ........................ 43/17

Primary Examiner—Aldrich F. Medbery
Assistant Examiner—Daniel J. Leach
Attorney—Michael I. Stewart ABSTRACT: An ice fishing apparatus including means to move a pivot support relative to a base. The apparatus includes first and second line supports each consisting of spaced-apart holders to hold a plurality of elongated loops of fishing line, the linear distance between the two holders of one support being greater than the linear distance between the two holders of the other support. An assemblable and disassemblable ice fishing apparatus also is described consisting of a plurality of cooperating members.

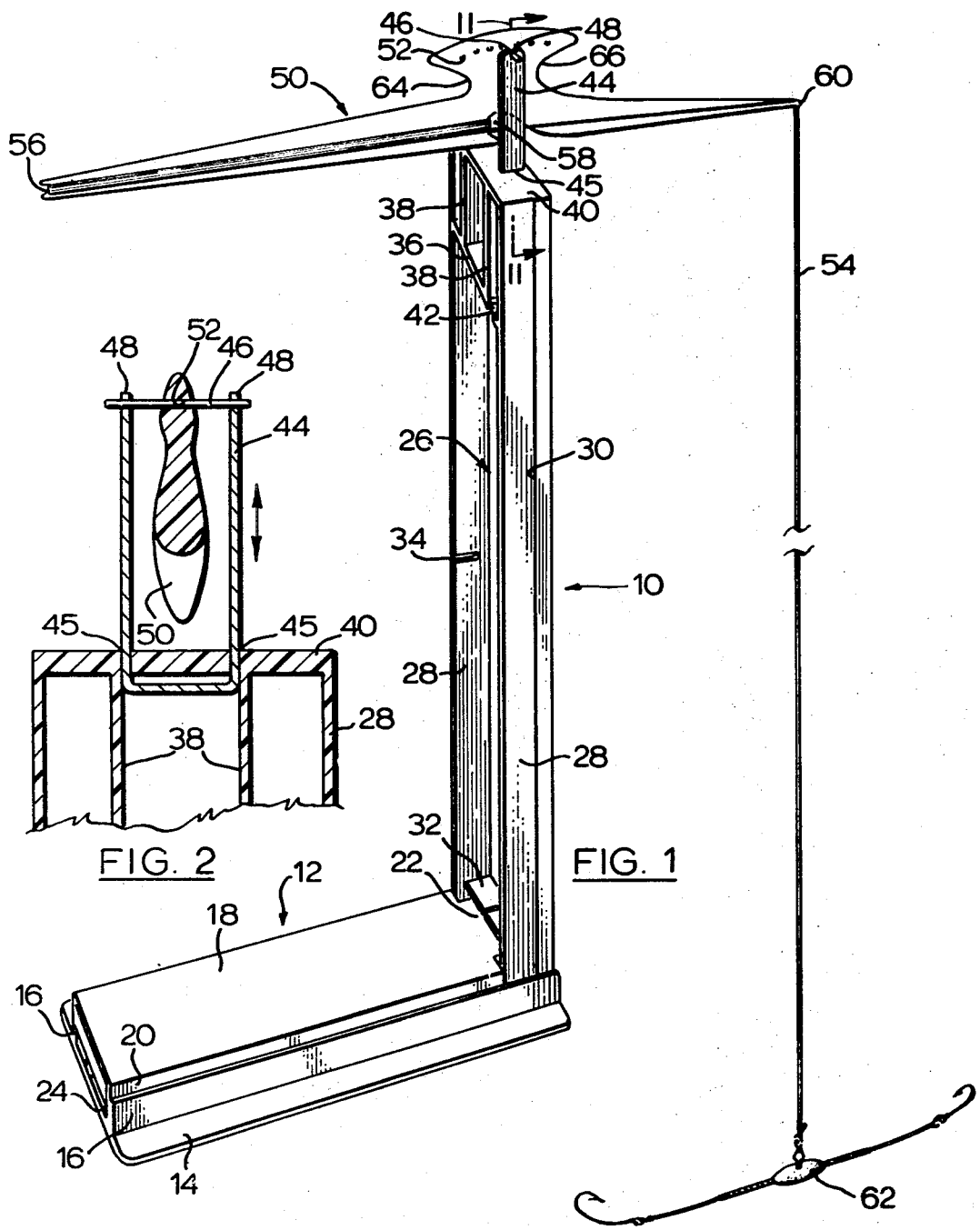

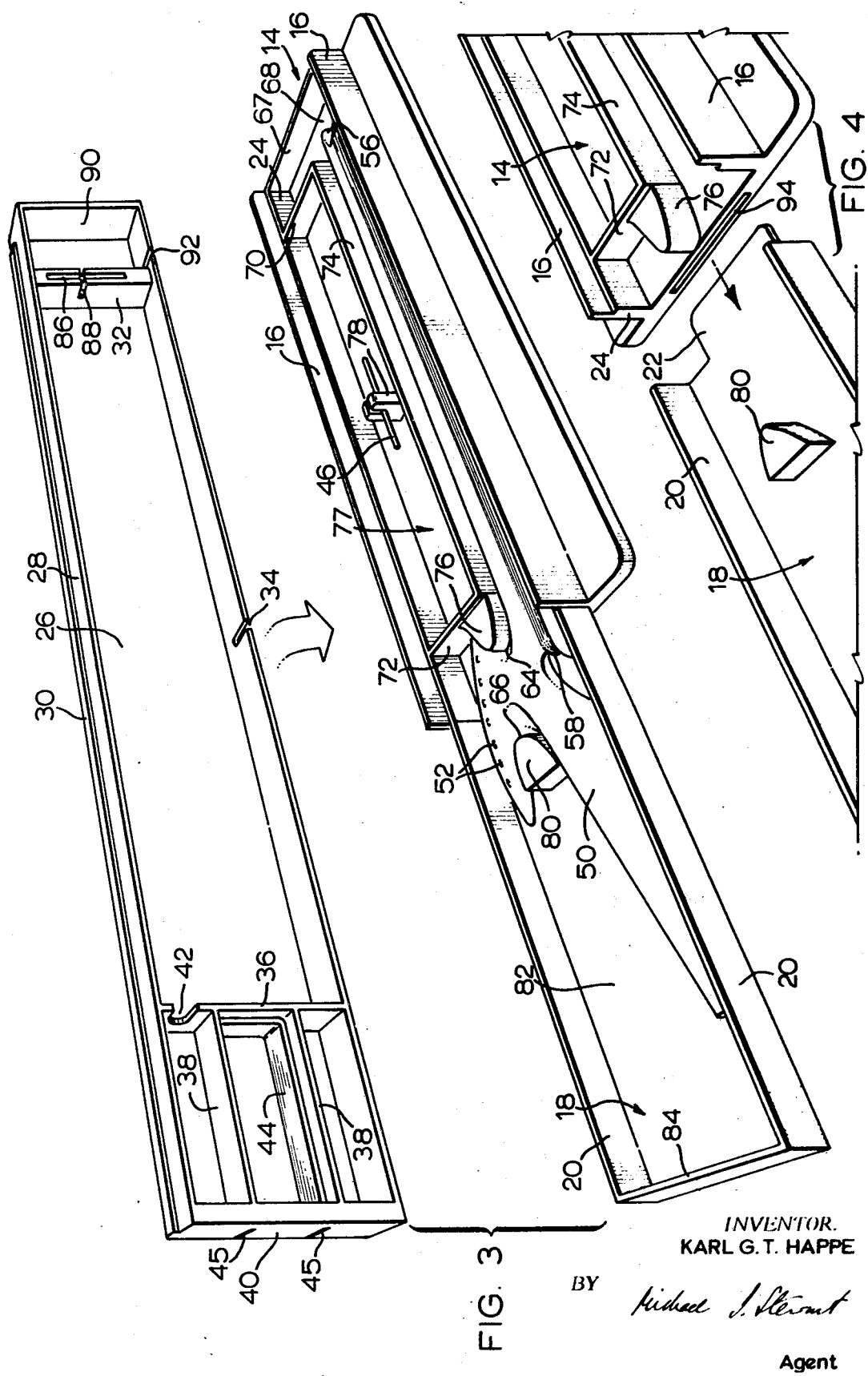

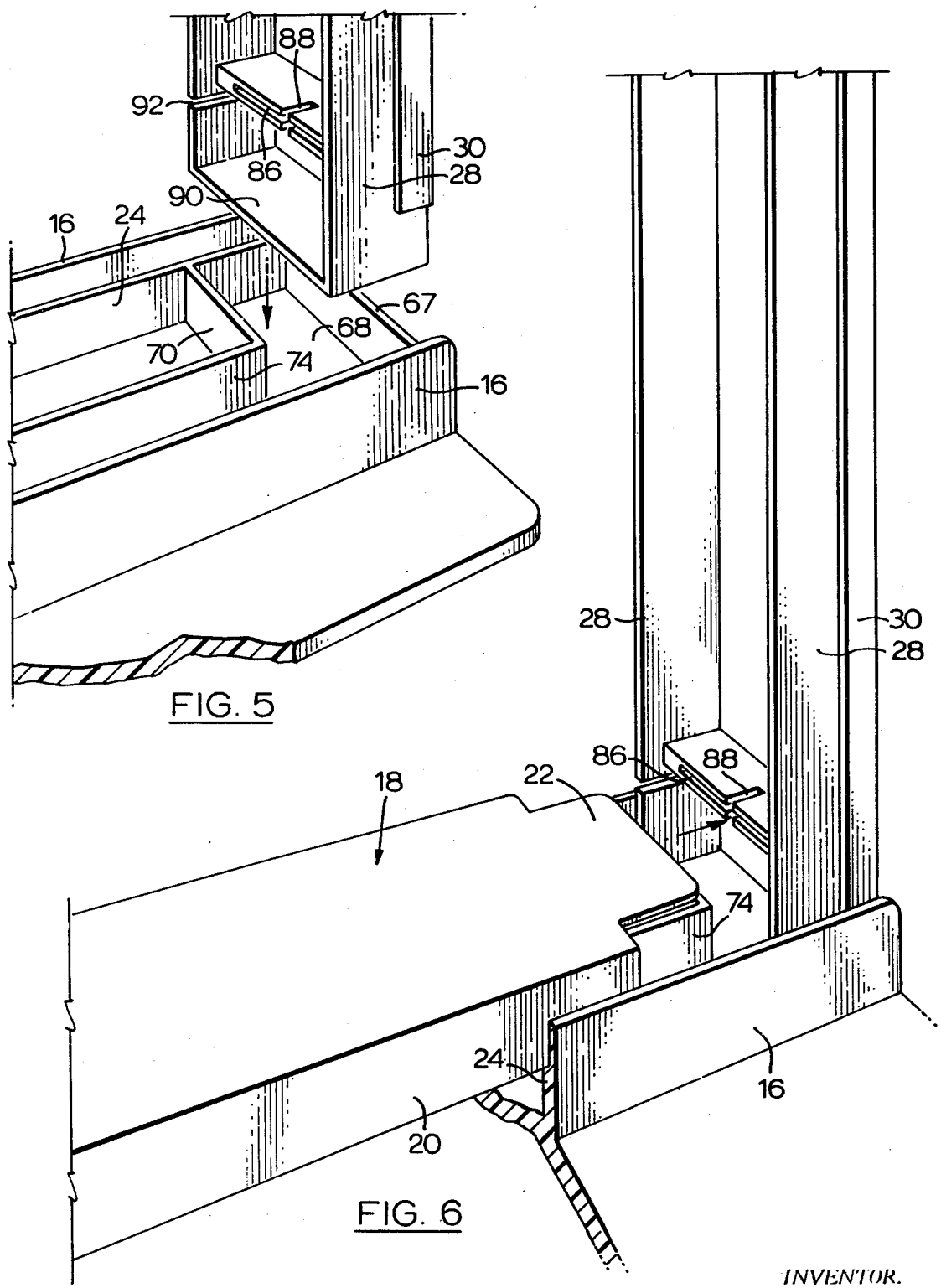

3,603,017

ICE FISHING APPARATUS

The present invention relates to ice fishing apparatus.

Conventional fishing rods and floats are impractical when fishing through holes in ice due to the long periods and cold temperatures involved. Ice fishing apparatus has been devised and such apparatus generally includes a base member, and a beam pivotally mounted with respect to the base member. The beam supports fishing line which passes therefrom to a hook or like fish-snaring device through a hole in the ice.

So as to detect when a fish is biting, it has been previously proposed in U.S. Pat. 2,650,052 issued Aug. 25, 1953, to Louis A Bintz to balance the beam about a pivot, so that the beam is horizontal. When a fish is biting, pivotal movement of the beam occurs. In this way the fisherman becomes aware of the fish and can act accordingly. Such an arrangement is very sensitive and is much more sensitive than arrangements where the beam is not horizontal and correctly balanced.

Fishing line may be held on a reel or on the beam in a series of loops as in U.S. Pat. 2,650,052, mentioned above. While the balanced beam arrangement does have certain advantages over the nonbalanced arrangement, the use of the beam to hold unused line does suffer from certain disadvantages. Thus, one complete loop of line must be removed or replaced when adjusting the length of line between the beam and the hook. This could readily lead to too long or too short a line. This is of particular importance when the fish snare is of the type which sits on the bottom of the body of water being fished.

The present invention seeks to overcome this defect by providing a fine or vernier adjustment to the length of line between the beam and the hook.

In addition, the present invention provides an ice fishing apparatus which is readily assembled and disassembled, and in its disassembled form may be readily carried, such as in a coat pocket.

The invention is illustrated by the accompanying drawings in which:

FIG. 1 is a perspective view of one embodiment of the invention in an assembled form, FIG. 2, is a sectional view taken along lines 11—11 of FIG. 1, FIG. 3, is a perspective view of one embodiment in a disassembled form, FIGS. 4, 5 and 6 are perspective views of certain portions of the device indicating some of the steps involved in forming an assembly such as that shown in FIG. 1. Throughout the drawings, the same reference numerals are used to indicate the same parts.

Referring to FIGS. 1 and 2, an ice fishing apparatus 10 includes a base 12 consisting of a lower portion 14 including walls 16 and an upper portion 18 including walls 20 and a tongue 22. The walls 16 include shoulders 24. The parts of walls 20, above shoulders 24 are spaced apart slightly less than the walls 16. Thus, the walls 20 rest on the shoulders 24.

An upstanding member 26 has walls 28 which are spaced apart a distance slightly less than the distance between the walls 16 below the shoulders 24. The walls 28 include a shoulder 30 which terminates just above the shoulder 24 when the device is assembled as shown. A crosspiece 32 is formed in the member 26 and includes a slot (not shown in FIG. 1 but readily visible in FIGS. 5 and 6) in which is received the tongue 22. This has the effect of stabilizing the member 26 relative to the base 12.

A slot 34 is formed in one of the walls 28. The reason for the presence of this slot will become apparent hereinafter.

At the upper end of member 26 is another cross piece 36 and two walls 38 spaced from and extending parallel to walls 28 between the crosspiece 36 and an end wall 40. A notch 42 is formed in the crosspiece 36. The reason for the presence of this notch 42 will become apparent hereinafter.

As will be more readily apparent from FIG. 2, the walls 38 act as vertical guides for a pivot support 44. The pivot support 44 has a generally U-shape, the arms of which are in interference fit with elongated slots 45 formed in the end wall 40. This enables the pivot support to be moved through a limited vertical distance.

The pivot support 44 and the means whereby such may be adjusted in FIGS. 1 and 2 represents only one embodiment of the invention. Clearly other pivot supports could be provided and other devices could be provided whereby the required vertical adjustment could be achieved.

The combination of the base 12 with the upright 26 represents a base member for the pivot support 44. The embodiment illustrated represents one way in which a suitable base member can be provided. Base members could be clearly provided in other manners.

The pivot support 44 supports a pivot pin 46 which rests in channels 48 formed in the upper ends of the arms of the support 44. Pivot pin 46 serves to pivotally mount a beam 50 on the pivot support 44. The use of a pivot pin represents one way in which the beam may be pivotally mounted on the pivot support. Other means to achieve this end could be employed.

The pivot pin 46 passes in interference fit through one of several openings 52 in the beam 50. The choice of the particular opening is dependent on a number of factors as will become apparent below.

Fishing line 54 is wrapped as a series of elongated loops between indentations 56 and 58 formed in the beam. The indentations 56 and 58 represent a first two spaced-apart fishing line-holding means. Indentations represent only one manner in which the fishing line may be held on the beam 50. Other devices could be employed; for example, the line could be held between two nails projecting from the beam 50.

The line 54 passes over a guide (not shown) at the tip 60 of the beam 50 and then downwardly through a hole in the ice to a fish-snaring device 62.

The beam 50 also includes opposed hooklike indentations 64 and 66. The indentations 64 and 66 represent a second two spaced-apart fishing line holding means. Such indentations could be replaced by other devices to produce the same effect. The only limitation on such alternative devices is that the distance between the members of the second two holding means is less than the distance between the members of the first two holding means.

When the fishing apparatus is in operation as illustrated in FIGS. 1 and 2, the fish-snaring device 16 rests on the bed of the body of water being fished and the beam is adjusted to an as-nearly-horizontal-as-possible position. This adjustment may be made by choosing the particular hole 52 through which to pass the pivot pin 46 whereby there is provided a balance.

Utilizing the particular fish-snaring device 62 illustrated, it is unsatisfactory if this is not placed on the water body bed. When the balance has been achieved as described above, the fish-snaring device may not so sit. The present invention provides for limited adjustment of the distance between the guide at the tip 60 and the bed of the body of water.

This may be achieved by adjusting the height of the pivot pin 46 relative to the base 12 by sliding the arms of the pivot support 44 in the slots 45 by the required amount.

Alternatively, an extra loop of line may be removed from between the first two indentations 56 and 58 and wrapped around the second two indentations 64 and 66. By removing line from between the second two indentations relatively small increments in the length of the line may be achieved.

Further, a combination of these two operations may be carried out to achieve the desired effect.

Turning now to consideration of FIG. 3, this shows the fishing apparatus disassembled. The lower portion 14 of the base 12 has an end wall 67 between the side walls 16 extending upwardly from the bottom 68 of portion 14 to the height of shoulders 24. Further walls 70 and 72 are formed upstanding from the bottom 68, parallel to and of equal height to the end wall 67. In addition, a wall 74 joins the inner extremities of walls 70 and 72 and is parallel to the sidewalls 16. Wall 74 extends to the same height as walls 70 and 72. The distance between wall 70 and end wall 67 is just slightly greater than the depth of the wall 28 of the upright member 26, so that the lower end of the upright may be received and supported between the two walls.

A projection 76 is formed on wall 72 of substantially the same external shape as indentation 64. Wall 74 provides rigidity to walls 70 and 72 and also serves to form an enclosed space 77 in which can be stored fish hooks, etc. An upstanding projection 78 is located within the enclosed space 77 and serves as a keeper for the pivot pin 46.

The upper portion 18 of the base 12 is joined to the lower portion 14 at their open ends. The joint is formed by the tongue 22 on the portion 18 received within a slot formed in the bottom of the portion 14. This is more clearly shown in FIG. 4.

A projection 80 is formed on the bottom 82 of the portion 18 and is of substantially the same external shape as indentation 66 on the beam 50. The projections 76 and 80 are so located that when portions 14 and 18 are joined together, beam 50 may be supported therebetween as shown in FIG. 3.

As indicated above the walls 20 of the portion 18 are spaced apart the same distance as the shoulders 24 on the walls 16. An end wall 84 is provided. This end wall 84 and the sidewalls 20 project upwardly, the same distance as the shoulders 24 on the walls 16.

The pivot support 44 is retracted so that there is no portion of the arms projecting through the slots 45 proud of the end wall 40. As shown in FIG. 3, the base of the pivot support abuts the crosspiece 36 when it is retracted and therefore constitutes a stop indicating that the support is retracted.

The crosspiece 32 can be seen to include a lateral slot 86 in which is received the tongue 22 when the device is assembled as seen in FIG. 1. The crosspiece also includes a vertical slot 88. There is an end wall 90 provided and it will be seen that the shoulder 30 does not extend the complete length of the sidewalls 28. The distance between the end of the shoulder 30 and the end wall 90 is at least equal to the vertical height of shoulders 24. A slot 92 is provided in the same sidewall 28 as slot 34. Slots 34 and 92 extend down to the shoulder 30. The distance between the shoulders 30 and the top of the walls 28 is equal to the height of the shoulders 24, and the depth of the shoulders 30 is equal to the distance between the top of the shoulders 24 and the top of the walls 16.

As indicated above, the distance between the walls 28 is slightly less than the distance between the shoulders 24 and the distance between the shoulders 30 is slightly less than the distance between the walls 16 above the shoulders 24. In addition, the length of the upright 26 is slightly less than the combined lengths of the two portions 14 and 18. It will be apparent that the upright 26 will neatly cooperate with the two portions 14 and 18 to form an enclosure in which can be stored the beam 50, the pivot pin 46 and any fish-snaring device. The upright 26 fits in between the walls of the portion 14 and 18 with its wall 28 projecting down within the walls 20 and shoulders 24. The slots 34 and 92 receive the walls 72 and 70, respectively, and slot 88 receives wall 74. The tops of walls 20 and shoulders 24 abut against shoulders 30. Slot 42 accommodates part of the beam 50. Notch 42 accommodates the tip 60 of the beam.

This arrangement has an extremely pleasing external appearance and can be readily transported. When it is wished to utilize the ice fishing apparatus, the apparatus may be erected in a few simple steps, as will be apparent from the following description of FIGS. 4, 5 and 6.

The upright member first is removed so that there is revealed the interior of the enclosure as seen in FIG. 3. The beam 50 is removed from its retaining position between the projections 76 and 80 and the pin 46 removed from its retaining position.

The portions 14 and 18 then are taken apart by sliding the tongue 22 out of a slot 94 in the bottom 68 of portion 14 (FIG. 4). The upright portion 26 then is inserted in the gap between the wall 70 and the end wall 67 resting with end wall 90 on the bottom 68. The ends of the shoulders 30 rest on the top of shoulders 24 and the walls 28 are held between the shoulders 24 (FIG. 5). The portion 18 then is turned upside down and slid with the top of walls 20 resting on top of shoulders 24 so that the tongue 22 engages slot 86 to firmly hold member 26 in an upright position (FIG. 6).

At any stage of these operations, once the upright 26 has been removed from on top of the portions 14 and 18, the pivot-supporting member 44 may be placed in an operative position.

Having reached the stage shown in FIG. 6, and having placed the pivot support 44 in an operative position, the pivot pin 46 can be passed through a hole 52 in beam 50, line 54 runs out to approximately the desired length, the beam 50 pivotally mounted on the support 44, and the balance, the length of the line or the height of the beam 50 adjusted as described above.

It is preferred that the center of gravity of the beam together with its attachments, i.e., line and fish-snaring device, be located in a plane below the pivot pin. This increases the sensitivity of the beam to movement caused by a fish biting. It is particularly preferred that the center of gravity of the beam together with its attachments be located directly below the pivot pin.

This latter arrangement is particularly sensitive. Sensitivity of the beam is important since the fish are particularly sluggish in the cold water. In the embodiment illustrated in FIG. 1 the center of gravity is located directly below the pivot pin 46.

Modifications are possible within the scope of the invention.

What I claim is:

1. Ice fishing apparatus comprising a base member, pivot support means, a beam adapted to support a fishing line, and a pivot pin pivotally mounting said beam on said pivot support means, said base member comprising an upright member and a base, said upright member having an upper portion and openings formed in said upper portion, said pivot support means comprises a generally U-shaped body having arms which are received in interference fit in the openings in said upper portion of said upright member and which supports said pivot pin, whereby said pivot support means and thereby said pivot pin may be moved vertically with respect to said base by passage of said arms through the openings in said upper portion.

2. The apparatus of claim 1 wherein said beam is balanced about said pivot pin and thereby maintained substantially horizontal.

3. The apparatus of claim 1 wherein the center of gravity of said beam when supporting a fishing line and a fish fish-snaring device is located in a plane below the pivot pin 4. The apparatus of claim 1 wherein the center of gravity of said beam when supporting a fishing line and a fish snaring device is located directly below said pivot pin.

5. The apparatus of claim 1 wherein said beam includes a first two spaced-apart fishing line-holding means adapted to hold a plurality of elongated loops of fishing line extending therebetween and a second two spaced-apart fishing line holding means, the linear distance between said first two holding means being greater than the linear distance between said second two holding means, whereby the length of fishing line between said beam and a fish snaring device can be adjusted by relatively minor amendments by winding line from said first two holding means around said second two holding means.

6. Ice fishing apparatus comprising a base member, pivot support means, a beam adapted to support a fishing line, and a pivot pin pivotally mounting said beam on said pivot support means, said beam comprising an elongated portion, a head portion and a neck portion joining said elongated portion and said head portion at a position intermediate the ends of said elongated portions, said elongated portion including first arcuately shaped indentations constituting a first two-spaced-apart fishing line-holding means adapted to hold a plurality of elongated loops of fishing line extending therebetween, one of said indentations being located in said elongated portion and below said neck portion and the other at one extremity of said elongated portion and remote from said neck portion, said head portion including a plurality of spaced-apart openings suitable to receive said pivot pin, said neck portion constituting a second two-spaced-apart fishing line-holding means, the linear distance between said first two-holding means being greater than the linear distance between said second two-holding means, whereby the length of fishing line between said beam and fish-snaring device can be adjusted by relatively minor amounts by winding line from said first two-holding means around said second two-holding means.

7. The apparatus of claim 6 wherein said base member comprises an upright member supported by a base.

8. An assemblable and disassemblable ice fishing apparatus comprising a beam, three cooperating members which in the assembled form cooperate to provide an upright member adapted to support the said beam on which fishing line is received and a base member supporting said upright member, said three cooperating members consisting of a first elongated member having a base and upstanding end and sidewalls, a second elongated member having a base and upstanding sidewalls, one end wall and an open end, and a third elongated member having a base, upstanding sidewalls and one end wall and an open end, the combined length of the bases of said second and third members being coextensive with the base of said first member, the sidewalls of said second and third members being spaced apart the same distance and the sidewalls of said first member being spaced apart a distance slightly less than that of the walls of said second and third members, said second and third members being capable of being releasably joined together in a lengthwise direction adjacent their open ends when said apparatus is in the disassembled form whereby there is provided an elongated body having sidewalls and end walls and a base coextensive with said first member, said first member nesting with said body to provide, in said disassembled form, an elongated enclosure in which is received and enclosed said beam.

9. The apparatus of claim 8 wherein said second elongated member includes a wall parallel to said end wall of said second member and spaced therefrom a distance slightly greater than the height of both the side and end walls of said first elongated member, whereby one end portion of said first member is received within the space between said end wall of said second member and the wall parallel thereto and said first member upstands from said second member, said third elongated member cooperating with said first and second members to provide rigid support for said first member.

10. The apparatus of claim 9 wherein said third elongated member includes a tongue and said first member includes a groove in which said tongue may be received, the sidewalls of said third member nesting on the sidewalls of said second member when said tongue is received within said groove, said second member including means to prevent relative-lateral displacement of said second and third members, whereby there is provided a rigid support for said first member.

11. The apparatus of claim 9 wherein said first elongated member includes pivot support means movable longitudinally with respect thereto, said pivot support means being adapted to support means pivotally mounting thereon a beam on which fishing line is received.